(12) United States Patent
Acharya et al.

(10) Patent No.: US 9,801,014 B2
(45) Date of Patent: Oct. 24, 2017

(54) PREDICTIVE ANALYTICS FOR LOCATION ESTIMATION OF IDLE UES IN A CELLULAR NETWORK

(71) Applicant: HITACHI, LTD., Tokyo (JP)

(72) Inventors: Joydeep Acharya, Sunnyvale, CA (US); Salam Akoum, Palo Alto, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/983,201

(22) Filed: Dec. 29, 2015

(65) Prior Publication Data

US 2017/0188184 A1   Jun. 29, 2017

(51) Int. Cl.
- *H04W 4/02* (2009.01)
- *H04W 68/00* (2009.01)
- *H04W 52/02* (2009.01)

(52) U.S. Cl.
CPC ......... *H04W 4/02* (2013.01); *H04W 52/0209* (2013.01); *H04W 68/005* (2013.01)

(58) Field of Classification Search
CPC .. H04W 4/02; H04W 52/0209; H04W 68/005
See application file for complete search history.

(56) References Cited

U.S. PATENT DOCUMENTS

| | | | | |
|---|---|---|---|---|
| 2013/0326137 | A1* | 12/2013 | Bilange | G06F 12/0866 711/113 |
| 2014/0024378 | A1 | 1/2014 | Khude et al. | |
| 2014/0106790 | A1* | 4/2014 | Kakinada | H04W 68/02 455/458 |
| 2015/0312359 | A1* | 10/2015 | Okabayashi | H04W 4/028 709/203 |
| 2017/0063686 | A1* | 3/2017 | Barrett | H04L 41/0806 |

OTHER PUBLICATIONS

"The Impact of Small Cells in MME Signaling", Alcatel-Lucent Application Note, 2013.

* cited by examiner

*Primary Examiner* — Marcos Torres
(74) *Attorney, Agent, or Firm* — Procopio, Cory, Hargreaves & Savitch LLP

(57) ABSTRACT

Example implementations described herein are directed to reducing the MME signaling overhead associated with paging and tracking area update procedures and also conserves UE battery life. This can be realized by using non-network data and applying predictive analytics algorithms to track the most probable locations of an IDLE UE, which may increase the overall efficiency of the network. In example implementations, MME signaling overhead associated with paging and TA update procedures may also be reduced, which can also conserve UE battery life.

15 Claims, 17 Drawing Sheets

PREDICTIVE ANALYTICS FOR LOCATION ESTIMATION OF IDLE UES IN A CELLULAR NETWORK

BACKGROUND

Field

The present disclosure is related generally to wireless systems, and more specifically, to providing location estimation of user equipment (UEs) in a cellular network.

Related Art

A related art cellular UE such as a smartphone transitions between two modes: CONNECTED when it is fully functional and transmitting and receiving messages and IDLE, when it suspends most of its activities in order to save battery power. In related art implementations, after the UE is done with some communication process, the UE waits for a period of time known as the radio resource control (RRC) Inactivity Timer. If there is no new data transmission or reception during that time, the UE enters the IDLE mode.

During IDLE mode, the UE does not monitor most of the data and control channels and participate in sending control information. A consequence of the IDLE mode is that, if the UE is moving when it is IDLE, the UE may move to the coverage area of a new base station and the network may not be aware of this transition. If a new data comes for the UE while it is IDLE, the Mobility Management Entity (MME) of the core network of the operator has to first send a paging message to the UE asking it to transition to CONNECTED mode so that the UE becomes capable of receiving the data. However, because the UE may have moved from its last known base station just before it went IDLE, the MME may not know the location of the UE. Thus, the MME sends the paging message meant for the UE to a large number of base stations to which the UE has been initially registered, and each of these base stations broadcast the paging message.

FIG. 1 illustrates paging and tracking area update for IDLE UEs. For purposes of paging, base stations (BS) are grouped into what is known as Tracking Areas (TA). In FIG. 1, three TAs (TA 1, TA 2 and TA 3) are shown. The UE is initially registered to a group of TAs which is called a TA List. As shown in FIG. 1, UE A is initially (at time t0) registered to TAs TA 1 and TA 2. Thus the TA List of UE A is {TA 1, TA 2}. Assume that UE goes IDLE at time t0 and is also mobile. At time instant t1, the UE is in a base station belonging to TA 2. If a new data comes for the UE at this time, the MME sends a paging message to all base stations in TA 1 and TA 2, which form the TA list for the UE. The base stations in turn broadcast the paging messages and the UE receives the message.

When the UE is IDLE, there is a possibility that the UE moves to a base station which is not in the TA list. This is shown at time t2, when the UE has reached a base station belonging to TA 3 (Assume that the UE went IDLE at t0 and remained IDLE from t0 to t1 and then t2). The UE does monitor certain system information periodically even in IDLE state and can determine which TA it belongs to. If the UE detects that it is in a new TA that is not in its TA list, the UE initiates a TA Update procedure with the MME.

A large TA list increases the cost of paging (paging can constitute 30-40% of a MME's signaling capacity) while a small TA list could mean more frequent TA updates. The frequent TA updates may drain UE battery power, thereby taking away the advantage of going to an IDLE state. Thus, optimizing paging and TA update procedures are considerations for cellular operators. The solution lies in an intelligent design of TA list by including those base stations where the UE is most likely to be found in the future. The related art looks for efficient means to predict the location of an IDLE UE at a future time.

Related art implementations have looked into paging optimization by trying to predict the location of an IDLE UE. There have been studies on basic mobility pattern (i.e. page the last 5 eNodeBs where the UE was observed). More advanced studies have looked at estimating a UE location based on device-to-device communication information or small cell communications.

An example of a related art implementation for estimating a UE location based on device-to-device communication information can involve using UE discovery for paging optimization. In such implementations, UE devices participate in peer to peer communication networks in which discovery signals are transmitted, and a cellular active UE device in the vicinity of the transmitter eavesdrops on the peer discovery signaling and detects the presence of the cellular inactive UE device. One example of such a related art implementation can be found in US Patent Publication No. 2014/0024378, herein incorporated by reference in its entirety for all purposes.

An example of a related art implementation for estimating a UE location based on small cell communications can involve paging optimization in small cell networks by using gateways. Such a related art implementation can involve receiving a paging message having a permanent user identity of a user for a specific UE, and determining a set of small cells for sending the paging message based on the small cell last visited by the UE as identified by the permanent user identity. One example of such a related art implementation can be found in US Patent Publication No. 2014/0106790, herein incorporated by reference in its entirety for all purposes.

SUMMARY

However, all of the related art approaches predict a UE location based only on network data. In example implementations of the present disclosure, non-network data such as location information from Global Positioning Satellite (GPS) or traffic information of roadways or train stations (depending on the UE location) is incorporated. Such information may provide valuable information about the direction the UE is headed and the likely future location. Example implementations of the present disclosure involve specific methods in which non-network data can be used to predict the future location of IDLE UEs.

In the related art, such algorithms were not implemented due to the inability to ingest and process huge amounts of additional non-network data by cellular operators. With the advent of big data and real time streaming analytics, these difficulties have begun to alleviate.

The example implementations reduces the MME signaling overhead associated with paging and tracking area (TA) update procedures and also may conserve UE battery life. Thus, the example implementations may increase the overall efficiency of the network.

Aspects of the present disclosure include an apparatus, which can involve a processor, configured to for a determination of a user equipment (UE) associated with the apparatus being in a connected mode, obtain a location of the UE from a base station associated with the UE; and estimate velocity of the UE based on information from the base station; and for a determination of a change of the UE from the connected mode to an idle mode, estimate possible locations of the UE based on the obtained location from the connected mode, and the estimated velocity from the connected mode.

Aspects of the present disclosure further include a system, which can involve a user equipment (UE) configured to communicatively interact with a vehicle, the UE comprising a first processor configured to determine velocity of the UE and location of the UE based on information provided by a vehicle; and an apparatus associated with the UE. The apparatus can involve a second processor, configured to, for a determination of the UE being in a connected mode, obtain the location of the UE and the velocity of the UE from the UE; and for a determination of a change of the UE from the connected mode to an idle mode, and estimate possible locations of the UE based on the obtained location from the connected mode, and the obtained velocity from the connected mode.

Aspects of the present disclosure further include a method, which can include for a determination of a user equipment (UE) being in a connected mode, obtaining a location of the UE from a base station associated with the UE; estimating velocity of the UE based on information from the base station; and for a determination of a change of the UE from the connected mode to an idle mode, estimating possible locations of the UE based on the obtained location from the connected mode, and the estimated velocity from the connected mode.

DETAILED DESCRIPTION

Figure 1:
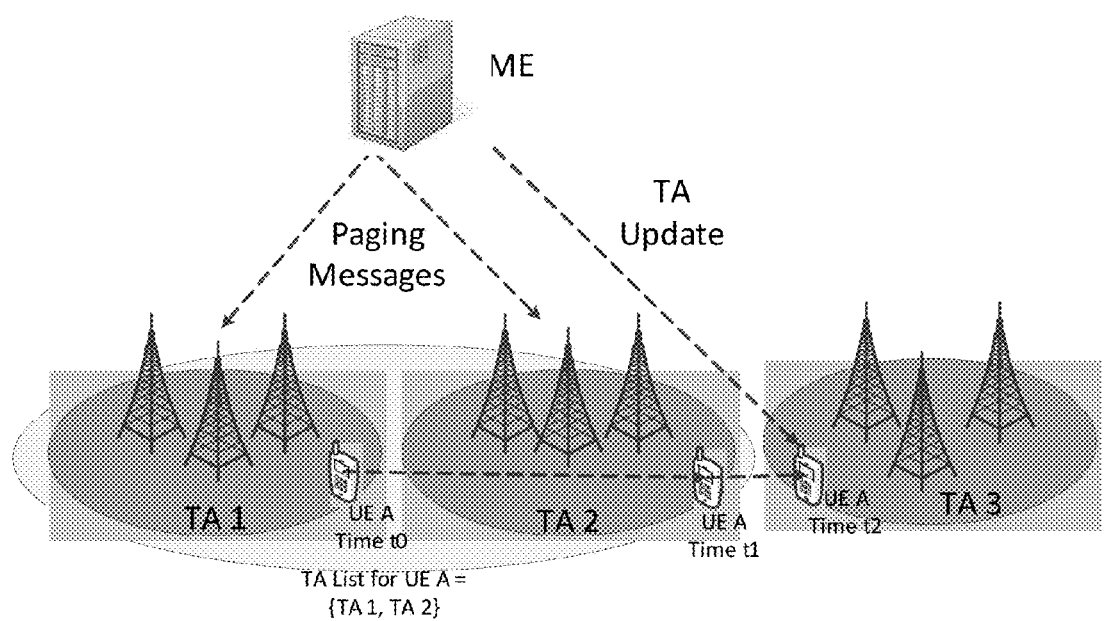
FIG. 1 illustrates paging and tracking area update for IDLE UEs.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The terms enhanced node B (eNodeB), small cell (SC), base station (BS) and pico cell may be utilized interchangeably throughout the example implementations. The implementations described herein are also not intended to be limiting, and can be implemented in various ways, depending on the desired implementation. The term "module" or "unit" can be implemented as a hardware solution including a dedicated circuit for executing one or more functions, or as a program that is loaded into a physical hardware processor for execution.

Figure 2:
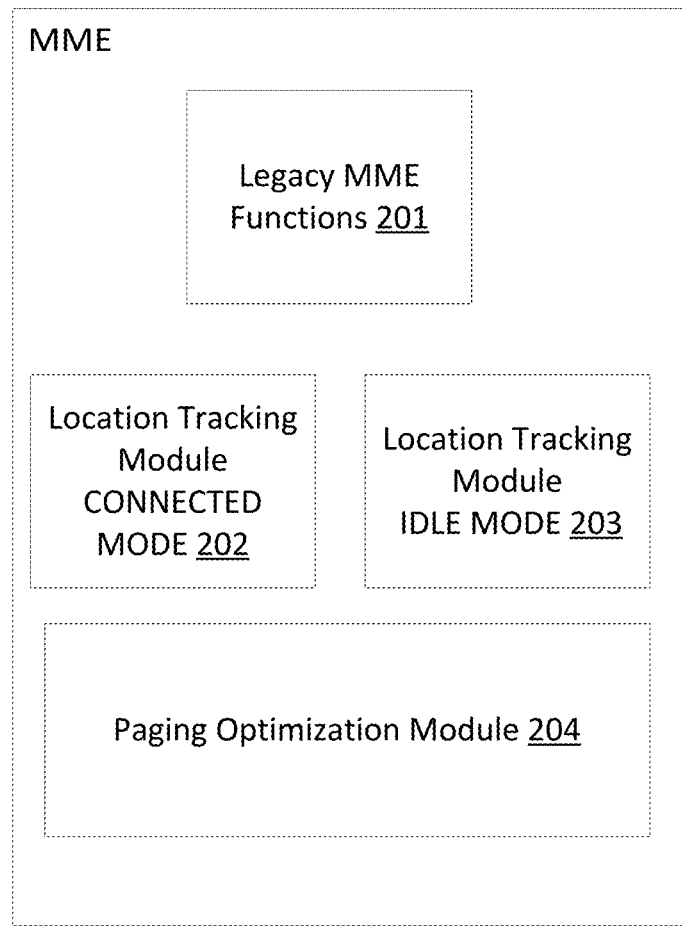
FIG. 2 illustrates an architecture block diagram for an MME including location tracking and optimization procedures, in accordance with an example implementation.

FIG. 2 illustrates an architecture block diagram for an MME including location tracking and optimization procedures, in accordance with an example implementation. As shown there are several functional blocks. The Legacy MME module 201 facilitates all of the functions of a legacy MME. The Location Tracking Module in CONNECTED Mode 202 conducts initial inputs and processing when the UE is in CONNECTED mode to help facilitate the prediction of location of UEs in IDLE mode. The Location Tracking Module in IDLE Mode 203 performs predictive analytics using non-network data to track the UE when it is IDLE. The TA Update Optimization Module 204 takes input from the Location Tracking Module in IDLE Mode 203 and optimizes the TA lists when a UE sends a TA Update message. The Paging Optimization Module 204 takes input from the Location Tracking Module in IDLE Mode and optimizes the paging procedure when a UE needs to be paged.

Figure 3:
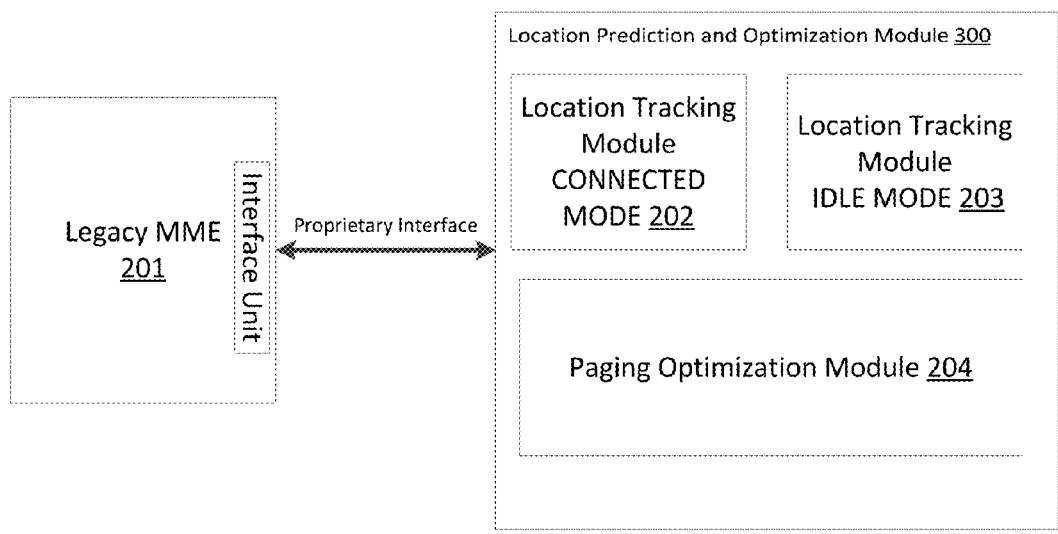
FIG. 3 illustrates an architecture block diagram for an MME including location tracking and optimization procedures, in accordance with an example implementation.

The example implementation as shown in FIG. 2 illustrates that operators may have to change legacy MMEs by introducing the four extra modules as indicated in pattern. Such implementations may not be feasible for MME vendors who would like to see minimal changes to existing MME architecture. Another example architecture implementation is shown in FIG. 3 where the main modules are now realized by an external module called the Location Prediction and Optimization Module 300 which performs all of the functionalities in one module. Such example implementations can be implemented as an external, third party optimization server to the cellular operators. The MME vendors would incorporate a new interface module in the legacy MME which can talk to the new Location Prediction and Optimization Module 300 and also define and implement a new interface for this communication process. However, the architecture in FIG. 3 may lead to lesser effort and redesign for MME vendors than the direct architecture of FIG. 2 and could be utilized in accordance with a desired implementation.

Figure 4:
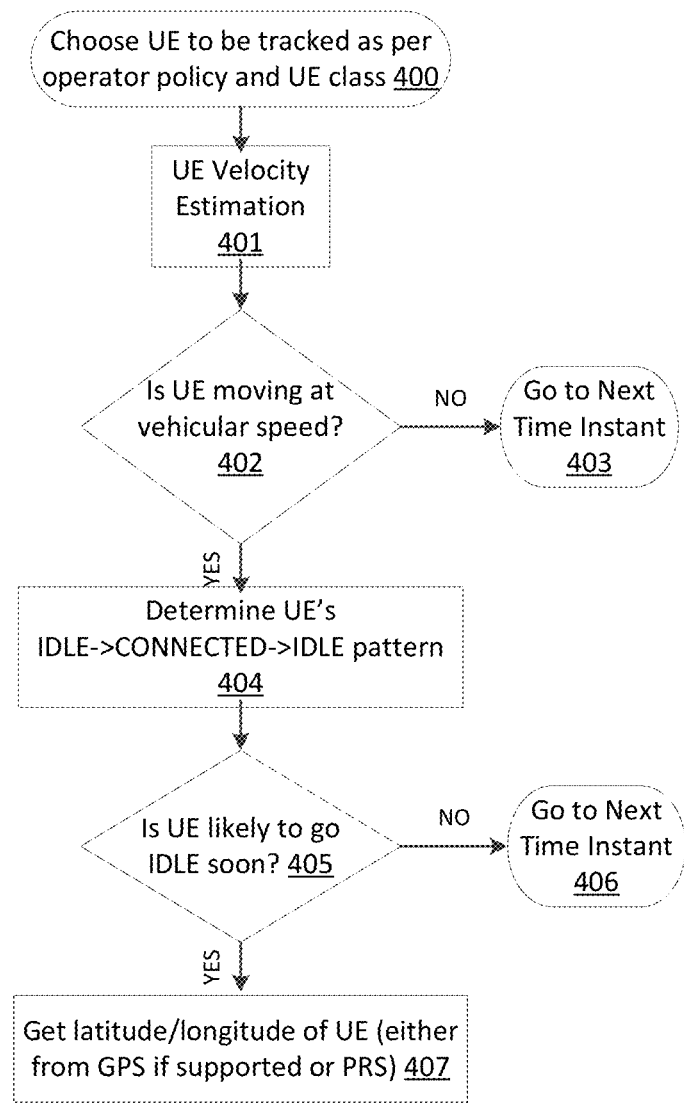
FIG. 4 illustrates an example flow diagram for the Location Tracking Module in Connected Mode, in accordance with an example implementation.

FIG. 4 illustrates an example flow diagram for the Location Tracking Module in Connected Mode, in accordance with an example implementation. The module is activated when the UE is in CONNECTED mode. The module facilitates information which can be interpolated to determine the current location of the UE while it is still in CONNECTED mode. In example implementations, the network may know the location of the UE to the granularity of the eNodeB under whose coverage the UE is in. The Location Tracking Module in Connected Mode attempts a finer estimate of the location all the way to the latitude and longitude of the UE with higher precision. The flow can be implemented as follows.

At 400, the module determines which UE to track for subsequent location prediction. If all UEs in the network are to be tracked, the UE may increase the signaling load of the MME significantly and thus may not be feasible. The UE may be chosen based on operator policy such as the UE belonging to a certain premium class or priority to UEs that are not stationary. For example, if a UE is static (e.g. indoor residential or office) then the algorithm to predict its future location may not be needed as it may be unlikely to change from the present location.

At 401, the module estimates the current velocity of the UE. This could be based on positioning reference signal (PRS) and the history of the base stations to which the UE had been associated to at a given time. At 402, a determination is made as to whether the UE is moving at a speed above a threshold (e.g., vehicular speed). If it is deemed that the UE is not moving faster than the threshold (No) (e.g., remaining fairly static), there is no need to start tracking the UE at the given time (no need to evaluate its exact location), and the flow proceeds to 403 to move to the next time instant. Otherwise, if it is deemed that the UE is moving faster than the threshold (Yes), then the flow proceeds to 404 to track the UE in order to predict the location at a later time when the UE is in IDLE mode. In example implementations, the MME first tries to estimate a pattern of its IDLE to CONNECTED transition times based on past history.

An example could be as follows
a. At 6 AM: IDLE from 6:00 AM-6:10 AM, CONNECTED from 6:10 AM-6:12 AM, IDLE from 6:12 AM-6:30 AM etc.
b. At 9 AM: CONNECTED from 9:00 AM-9:30 AM, IDLE from 9:30 AM-9:35 AM, CONNECTED from 9:35 AM-9:40 AM etc.

At 405, based on the IDLE to CONNECTED transition patterns, the flow determines if the UE is about to transition to IDLE mode. If the pattern as determined at 404 does not indicate that the flow is about to transition to IDLE mode (No) then the flow proceeds to 406 to proceed to the next time instant.

If, as a result of the pattern determined at 404, the flow determines that the UE is about to go IDLE, then the flow proceeds to 407 to estimate the location of the UE. The location of the UE may be estimated by means of network signaling (for example transmitting positioning reference signals (PRS) for a Long Term Evolution (LTE) UE) or other non-network methods (e.g. usage of GPS information if available). If such estimation methods are not available, estimation of the UE location can also be obtained from the location of the serving eNodeB and the received power from the UE at the eNodeB, which gives an indication of how far the is from the eNodeB. In general, all these information may be utilized in singular or in combination to estimate the location of the UE. Example implementations are not limited to any specific algorithm, rather the above is a description general framework within which a specific algorithm may be realized, and other implementations are also possible depending on the desired implementation.

Note that the flow at 404 utilizes patterns to predict the event that the UE is going to go IDLE and then, the flow initiates signaling to determine the exact location of the UE. Since the flow is a prediction process, it may be inaccurate in certain circumstances. For example, it is possible that an IDLE event is missed and thus the location of the UE is not obtained for the subsequent module. An example safe estimate can include predicting with high probability that the UE is going to become IDLE. This example implementation can ensure that the location of the UE is computed more frequently at each time instant, but can increase signaling and processing overhead for the network. From the UE perspective, if PRS is always transmitted, fewer resources would be available for actual data reception. Thus a reasonable trade-off and balance should be established which is provided by the operator of the desired implementation of the present disclosure.

Once the location (latitude, longitude) of a UE is derived, the location is stored until the flow of FIG. 4 is repeated at a later time, and a new location is generated to update the stored value. If the procedure is repeated frequently, then the network always has the most current location of the UE. Thus, the flow diagram can assist in predicting when the UE would go IDLE.

Figure 5:
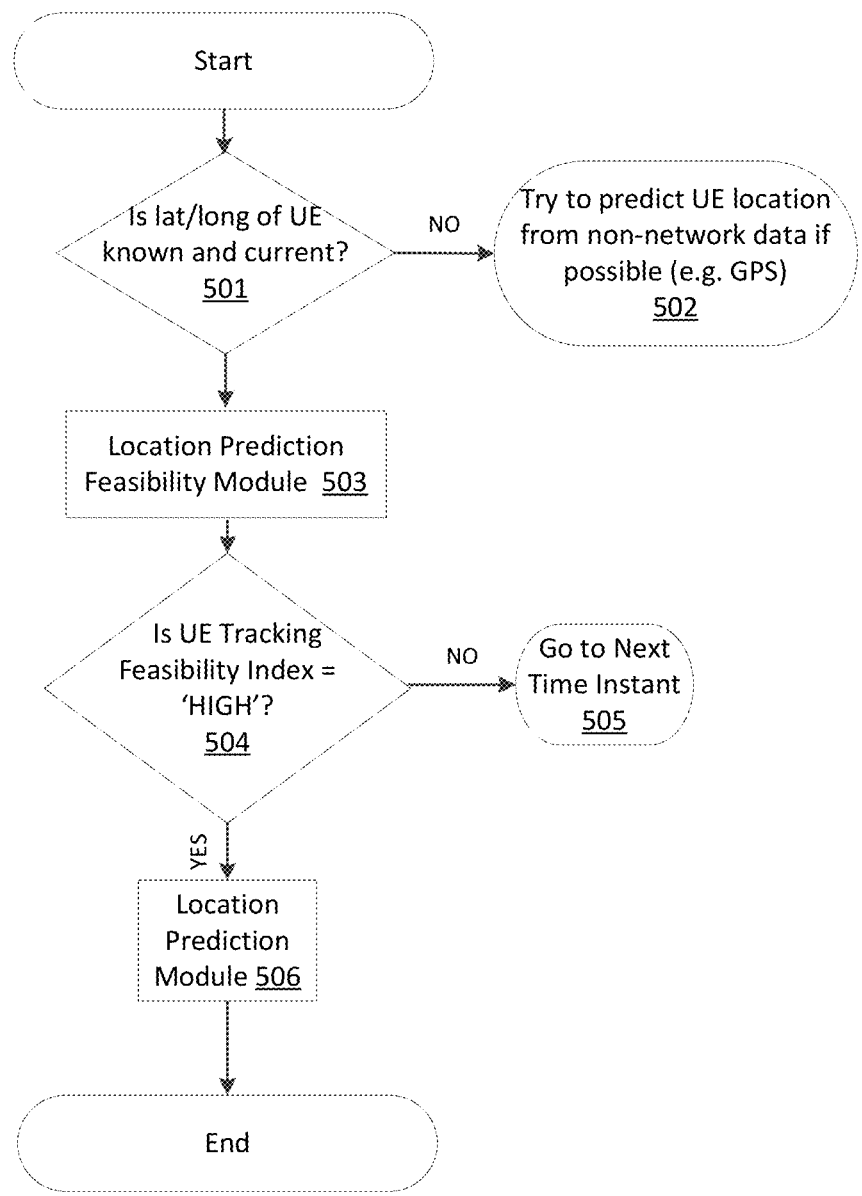
FIG. 5 illustrates an example flow diagram of the Location Tracking Module in IDLE Mode, in accordance with an example implementation.

FIG. 5 illustrates an example flow diagram of the Location Tracking Module in IDLE Mode, in accordance with an example implementation. The flow is activated when the UE is in IDLE mode. Location Tracking Module in IDLE Mode utilizes two submodules; the Location Prediction Module and the Location Prediction Feasibility Module as described below. The location tracking module in IDLE mode is configured to check the recency of the stored location estimate for a UE as shown at 501. If the network deems the information is not current (No), then the flow proceeds to 502 to estimate the current location. In an example implementation, the flow can choose to use non-network data like GPS (subject to availability) to estimate the current location. However, other implementations are also possible according to the desired implementation, including disregarding the recency of the estimation and proceeding to the flow at 503. If the information is current (Yes), then the flow proceeds to 503 to invoke the Location Prediction Module.

After the current location is estimated, the Location Prediction Feasibility Module does a feasibility check to see if the location of the UE can be reliably estimated at a later date at 504. Further details of the Location Prediction Feasibility Module are provided in FIG. 6. The module inputs various policies of the operator and defines an index called the 'UE Tracking Feasibility Index' for each UE that is considered for tracking until the present. If the module determines that it is feasible to track a UE it marks the 'UE Tracking Feasibility Index' as 'HIGH' (e.g., with a probability that meets a threshold) (Yes) the Location Tracking module is invoked at 506, otherwise (No), the flow proceeds to the next time instant at 505. Two examples of such situations are provided with respect to FIG. 11 and FIG. 12. If the module determines that it is not feasible to track a UE, then the Location Prediction Feasibility Module marks the 'UE Tracking Feasibility Index' as 'LOW'. An example of such a situation is shown subsequently in FIG. 13.

Figure 6:
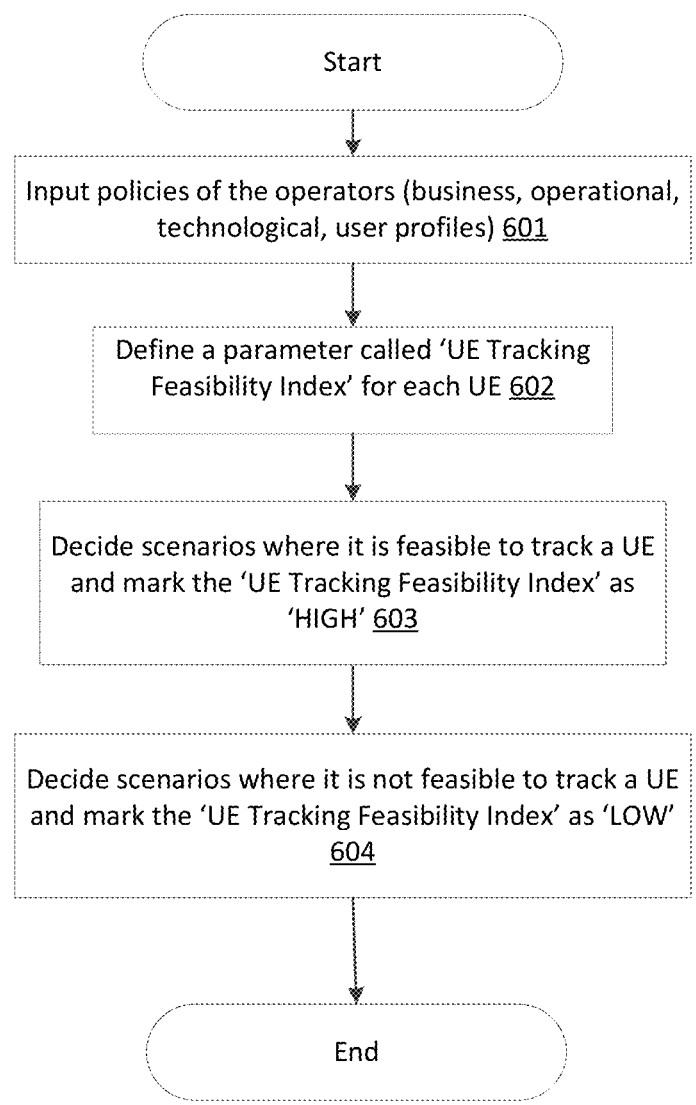
FIG. 6 illustrates a flow diagram for a Location Prediction Feasibility Module, in accordance with an example implementation.

FIG. 6 illustrates a flow diagram for a Location Prediction Feasibility Module, in accordance with an example implementation. The Location Prediction Feasibility Module is a sub module of the Location Tracking Module in IDLE Mode, and when invoked by the Location Tracking Module in IDLE Mode, executes the following flow. At 601, the module receives as input polices of the operators, which can include business, operational, technological, and user profiles. At 602, the module defines a parameter called 'UE Tracking Feasibility Index' for each UE. At 603, the module decides scenarios where it is feasible to track a UE, and mark the 'UE Tracking Feasibility Index' as 'HIGH'. For example if a UE is deemed to be moving along a highway with few intersections or is deemed to be inside a train which will be subsequently moving along a single track, it may be easier (e.g. more feasible) to subsequently track the UE position. Input policies of operators may be such that only a certain class of users (e.g., Premium users) who have paid more to avail of this specialized location tracking in IDLE mode service, are tracked and their 'UE Tracking Feasibility Index' is set as 'HIGH'. At 604, the module decides scenarios where it is not feasible to track a UE (e.g. UE passing through residential areas where it may have stopped) and mark the 'UE Tracking Feasibility Index' as 'LOW'. For example it may not be feasible to track the subsequent UE position if there are multiple different intersections and this too many possible options about where the UE may go.

Figure 7:
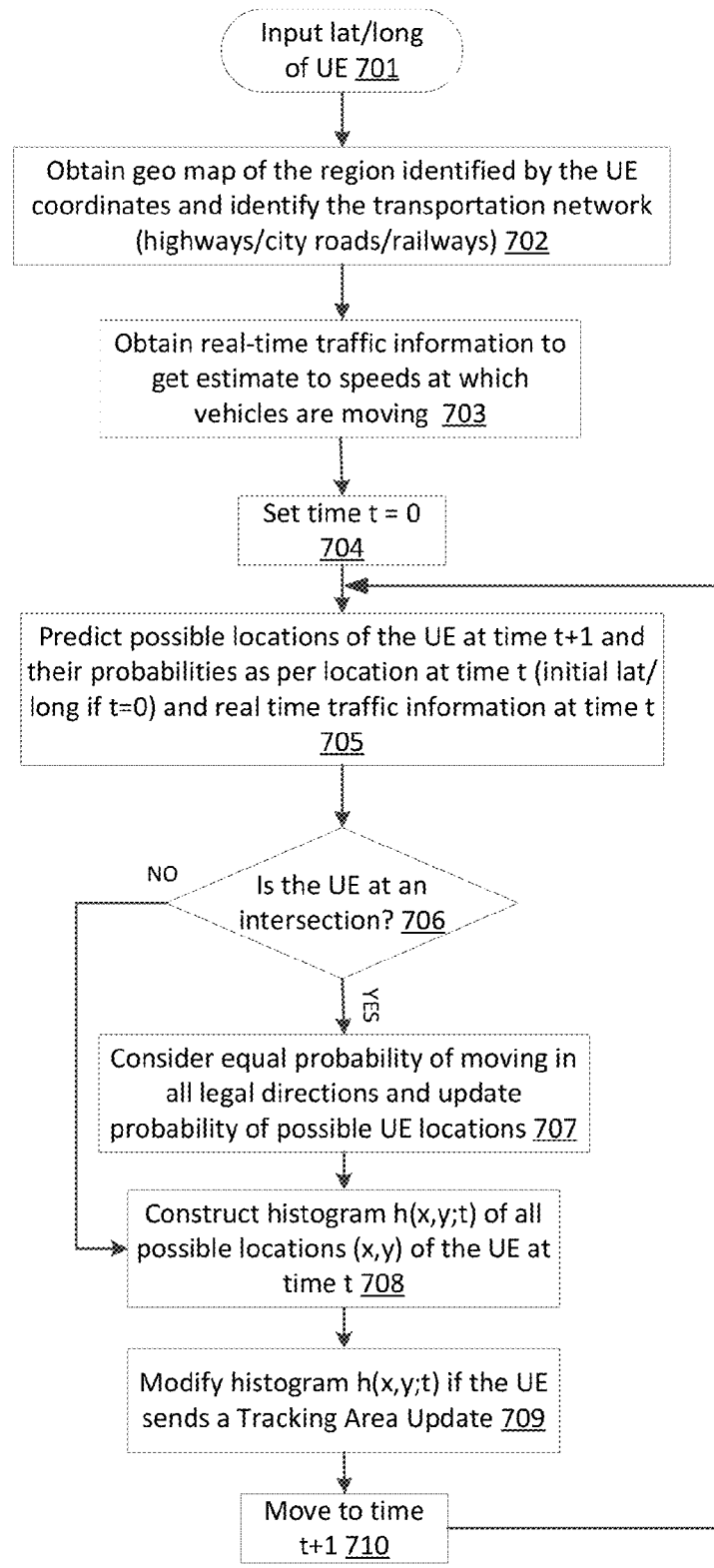
FIG. 7 illustrates a flow diagram for the Location Prediction Module, in accordance with an example implementation.

FIG. 7 illustrates a flow diagram for the Location Prediction Module, in accordance with an example implementation. The Location Prediction Module is a sub module of the Location Tracking Module in IDLE Mode, and when invoked by the Location Tracking Module in IDLE Mode, executes the following flow. The flow for the Location Prediction Module can involve the usage of real-time traffic information, and proceeds as follows.

At 701, the current location of the UE (e.g. latitude/longitude) is obtained based on the flows as described above. At 702, the location prediction module obtains the geo-spatial map of the location around the UE. That is, the location module prediction module can determine from the geo-spatial map if the UE is on a highway, in some road in a city center or in a railway station or in a train. Some of the determination may involve estimation (for example if the UE is inside a train) and thus may not be exact. However, the example implementation is directed to predict the probable locations of the UE and not necessarily the exact locations. The baseline is that the network knows the UEs location is within the Tracking Area (TA) list which can be a large region. Example implementations determine regions within that TA list where the UE could be located with high probability.

At 703, based on the information from 702, the location prediction module predicts the location of the UE at a later time. The prediction can take into account the real time traffic information (in case of roadways). For example, if there is congestion on the road, then the UE may be unlikely to move much ahead at a future time. Such determinations can depend on the nature of congestion, average traffic speed, the time at which the location is to be computed, and so on.

At 704, the loop is initiated for a timer and the timer t is set to 0. At 705, the location prediction module predicts possible locations of the UE at time t+1 and the probabilities per location at time t. If t is zero, then the initial latitude and longitude of the UE is utilized as the location. The prediction also takes into account real time traffic information at time t. The implementation of location prediction may be conducted according to any desired implementation.

At 706, a determination is made if the UE is at an intersection. The event of UE being at an intersection is inferred (predicted) from current location of UE and average speed based on congestion. Assume a probability of the UE turning in all possible allowed directions and thus predict the probable locations of the UE. If so (Yes), then there is a chance that the UE changes directions, and the flow proceeds to 707. If not (No), then the flow proceeds to 708.

At 707, if the UE is at an intersection (e.g. in case of roadways) there is a chance that the UE changes directions. The event of UE being at an intersection is inferred (predicted) from the current location of the UE and the average speed based on congestion. Assume a probability of the UE turning in all possible allowed directions as being equal, and thus predict the probable locations of the UE.

At 708, the location prediction module builds a set of probable locations of the UE with each location weighted by the probability of the UE being at the location. The set and the probabilities may change with time. Thus, the location prediction module creates a histogram of possible UE locations at any given time. At 708, the location prediction module constructs the histogram $h(x,y;t)$ of all possible locations $(x,y)$ of the UE at time t+1.

At 709, the location prediction module is configured to update the histogram if the UE transmits a TA Update signal with its current TA location. Thus, the location prediction module modifies histogram $h(x,y;t)$ when the UE sends a Tracking Area Update. At 710, the location prediction module moves to the next time increment and repeats the flow of FIG. 6 for building the histogram of the probable UE locations. Thus the flow diagram of FIG. 7 repeats the algorithm and builds the histogram of the probable UE locations.

In some example implementations, real time traffic information may be difficult to obtain. In such implementations, historical or average traffic information, or other methods may be utilized instead, depending on the desired implementation. For example consider the case when the UE is in a train. In this case, the average train speeds in the route may suffice as train speeds are unlikely to vary dynamically due to congestion. In this case, average train speeds in the route may suffice as train speeds are unlikely to vary dynamically due to congestion. Thus, in another example implementation of the Location Prediction module that works with historical/average information.

Figure 8:
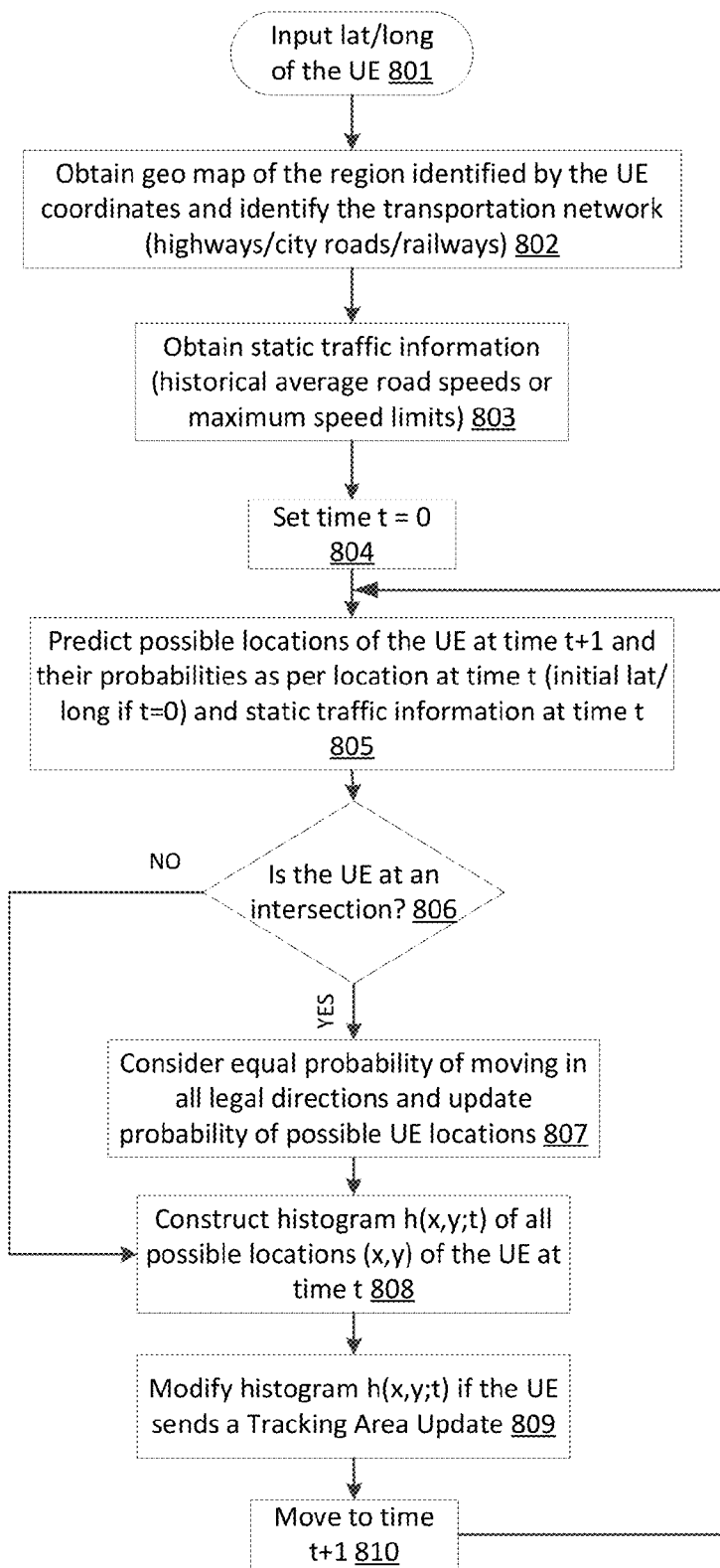
FIG. 8 illustrates another example implementation of the Location Prediction module with the utilization of historical/average information.

FIG. 8 illustrates another example implementation of the Location Prediction module with the utilization of historical/average information. The flow begins at 801, wherein the location prediction module obtains the current location of the UE, including the latitude and longitude. At 802, the location prediction module obtains the geo-spatial map of the location around the UE, and also identifies the transportation network (e.g. highways/city roads/railways).

The location prediction module determines from the location and transportation network if the UE is on a highway, in some road in a city center or in a railway station or in a train or so on. Some of the information may involve an estimation (for example if the UE is inside a train) and thus may not be exact. At 803, the flow obtains static traffic information (e.g. historical average road speeds or maximum speed limits), and a timer t is set to zero at 804.

In this example implementation, the module is to predict the most probable locations of the UE and not necessarily the exact locations. Recall that the baseline is that the network knows the location of the UE is within the Tracking Area list which may be a large region. The module attempts to procure regions within that TA list where the UE could be located with high probability. Based on this information, at 805 the flow predicts the location of the UE at a later time. The prediction takes into account the historical traffic information (in case of railways for example) and average speeds. Specifically, at 805 the location prediction module predicts possible locations of the UE at time t+1 and their probabilities as per location at time t (initial latitude/longitude if t=0) and static traffic information at time t.

At 806, a determination is made as to whether the UE is at an intersection (in case of roadways). If so (yes), then there is a chance that the UE changes directions, otherwise (no) the flow proceeds to 808. The flow proceeds to 807 and assumes that the probability of the UE turning in all possible allowed directions is equal. At 808, the module predicts the probable locations of the UE. In this example implementation a set of probable locations of the UE is built with each location weighted by the probability of the UE being there. The set and the probabilities may change with time. Therefore, a histogram of possible UE locations at any given time is created, so histogram h(x,y;t) of all possible locations (x,y) of the UE at time t+1 is constructed. At 809, in between if the UE transmits a TA Update signal with its current TA location, then the histogram is updated with the TA update information. At 810, the timer is incremented and the flow diagram is repeated and the histogram of the probable UE locations is constructed.

Figure 9:
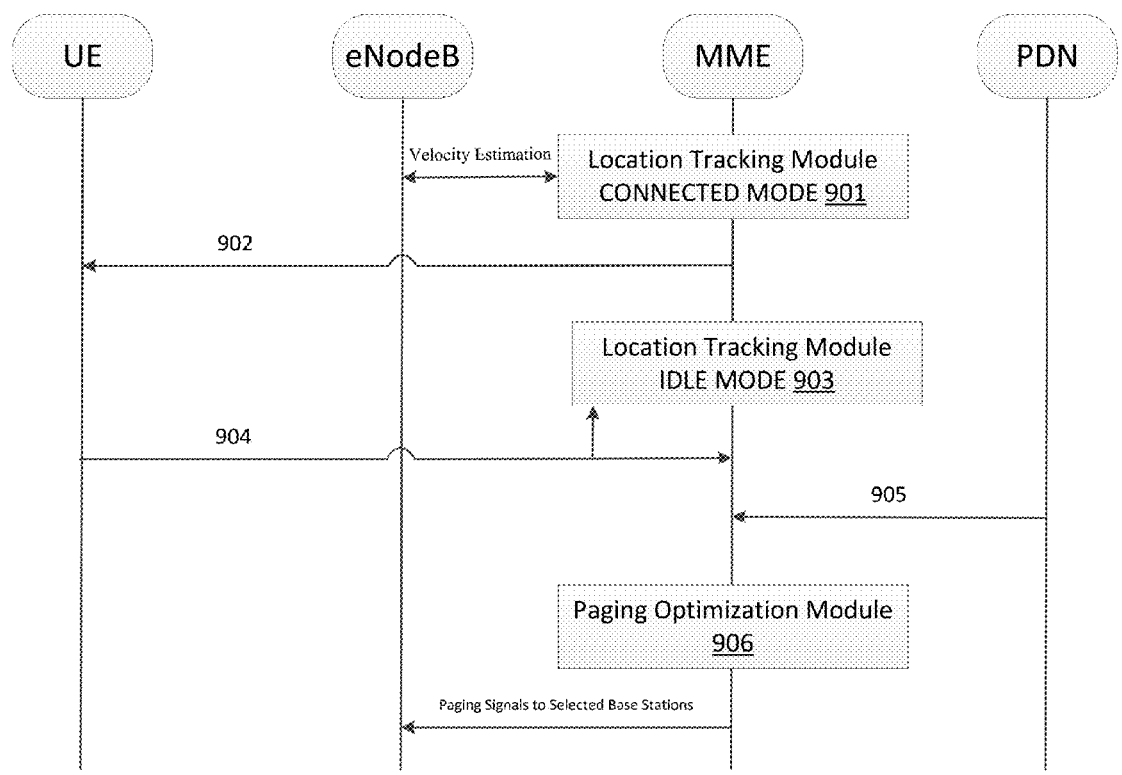
FIG. 9 illustrates an example timing diagram of the overall system, in accordance with an example implementation.

FIG. 9 illustrates an example timing diagram of the overall system, in accordance with an example implementation. The flow proceeds as follows. At 901, the UE starts in CONNECTED mode. The Location Tracking Module in CONNECTED mode is in operation trying to evaluate the exact location of the UE. The module interacts with the eNodeB to determine the velocity of the UE. At 902, the MME sends a signal to the eNodeB indicating that the UE should go to IDLE mode (e.g. IDLE Mode Transition). At 903, the Location Tracking Module in IDLE mode is activated. At 904, if the UE sends a TA update signal, then the signal goes to the Location Tracking Module in IDLE mode module (e.g. TA Update Procedure). At 905, if the UE is IDLE and a packet data network (PDN) sends some data for the UE, the paging optimization module is activated. This takes the UE histogram information from the Location Tracking Module in IDLE mode. At 906, the MME sends paging signals to the selected base stations as per the paging optimization module.

Figure 10:
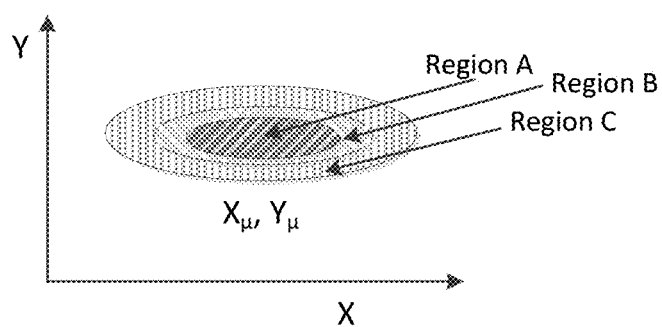
FIG. 10 illustrates an example histogram, in accordance with an example implementation.

FIG. 10 illustrates a sample histogram, in accordance with an example implementation. Specifically, FIG. 10, illustrates a sample histogram h(x,y;t). As illustrated in FIG. 10, the histogram is a 2-D contour plot in the x-y plane at any given time t. The area within the histogram (the elliptical regions shown in FIG. 10) are areas where the UE may be found (i.e. the areas where the location prediction module in FIG. 7 and FIG. 8, predicts possible location of the UEs) and the different shaded regions denotes different probabilities of occurrence. For example, the probability that a UE may be located is highest in the innermost shaded region A (e.g. 50%) and then the next shaded region B (e.g. 35%) and least in the outermost shaded region C (e.g. 15%).

Figure 11:
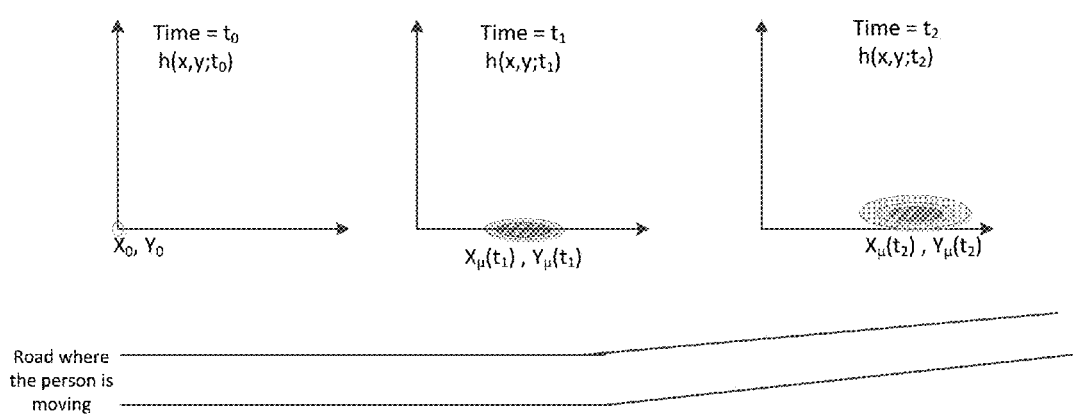
FIG. 11 illustrates an example of the evolution of a histogram over time for a highway situation, in accordance with an example implementation.

FIG. 11 illustrates an example of the evolution of a histogram over time for a highway situation, in accordance with an example implementation. Specifically, FIG. 11 is an illustration as to how histograms can be calculated for different road topologies and how the histograms can evolve over time. In FIG. 11, we show an example where the UE is inside a vehicle, moving along a highway. The initial location of the car at time $t_0$ (before it went IDLE) is known. At time $t_k$, the mean location of the UE is calculated to be $X_\mu(t_k)$ and $Y_\mu(t_k)$ respectively. These can be calculated based on the initial location and information about the UE speeds (real time as in the flow diagram of FIG. 7 and average as in the flow diagram of FIG. 8) and the time difference $(t_k-t_{k+1})$. The spread of the histogram about the mean values (i.e. the width of the histograms) can be computed based on the granularity and accuracy of the road topology and speed conditions. For example, for the flow diagram of FIG. 8, the real time vehicle speeds are not available and thus it can be difficult to exactly pinpoint the location of the UEs after some time. The flow can only output a relatively large area where the UE is likely to be located. Thus, the spread/width of the histograms is larger (i.e. the algorithm can predict that the UE is located somewhere within a large area as denoted by the ellipse). Note that since the UE is moving along a more or less straight road, the histograms have more spread along the X dimension and is more or less centered around Y=0.

Figure 12:
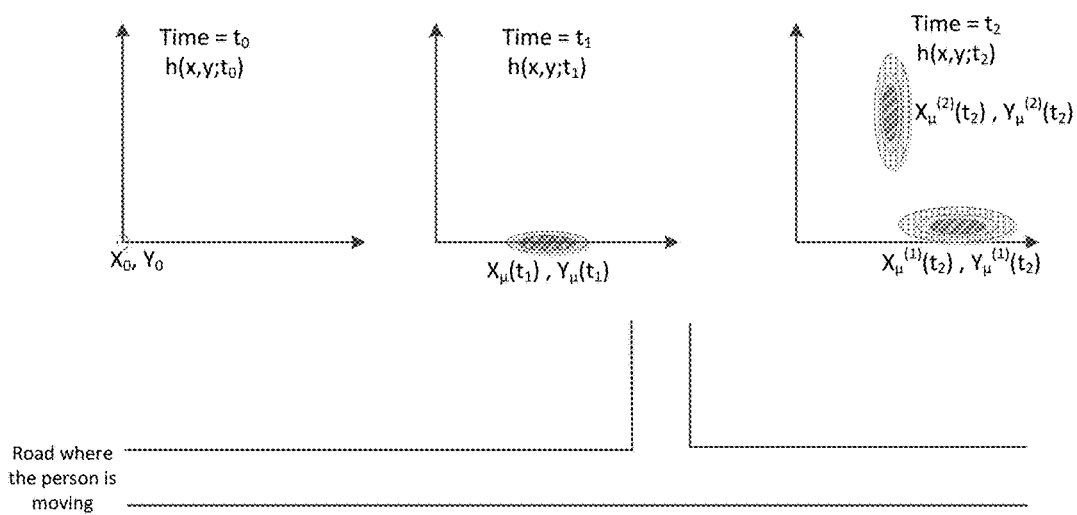
FIG. 12 illustrates an example evolution of a histogram over time for a road with one intersection, in accordance with an example implementation.

FIG. 12 illustrates an example evolution of a histogram over time for a road with one intersection, in accordance with an example implementation. FIG. 12, illustrates another example to depict the case, when there is an intersection in the road as inferred from road network topology and traffic information. The user may or may not turn at the intersection, and since such information not known to the Location Prediction module, the module assumes an equal probability for both possibilities. Thus there are two distinct ellipses in the histogram representing the scenarios when the user took and did not take the intersection.

Figure 13:
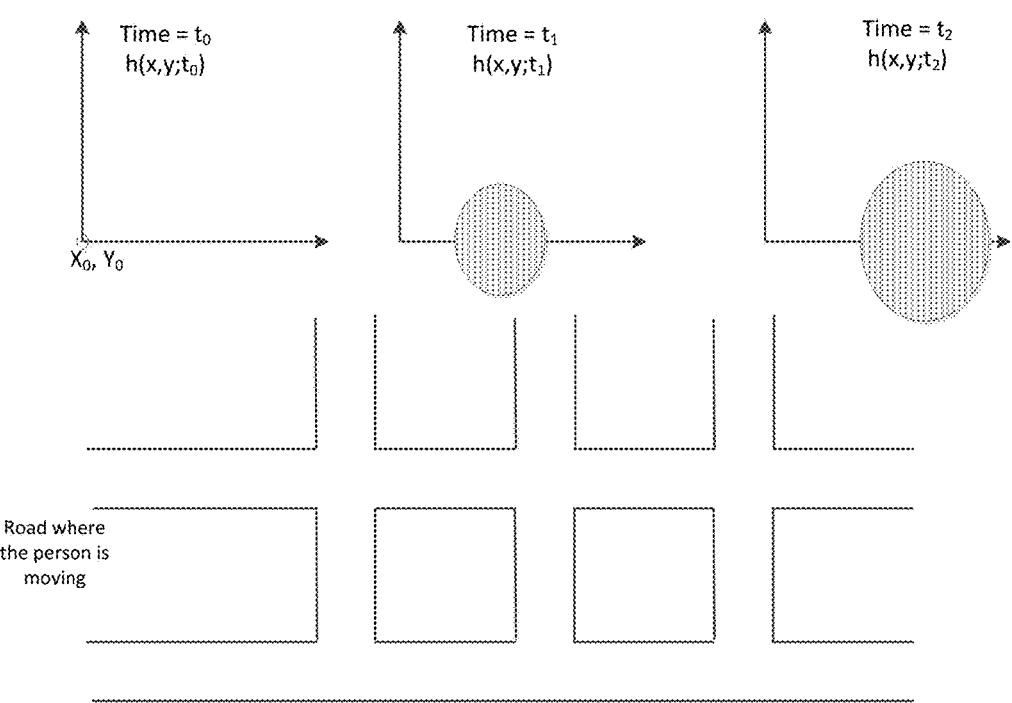
FIG. 13 illustrates an example evolution of a histogram over time for an urban area having many intersections, in according with an example implementation.

FIG. 13 illustrates an example evolution of a histogram over time for an urban area having many intersections, in according with an example implementation. Since there are a large number of paths the UE can take, the Location Prediction algorithm concludes that the UE is present with equal probability anywhere within an enclosed circular region. As time increases, the radius of this circular region also increases, indicating a higher degree of uncertainty about the UE location. After some time, the area of the circles may be too large for the algorithm to provide desired results. For example the area of the circular histogram may cover the entire tracking area list. In such cases, the application of the location tracking algorithm may not yield extra benefit. Thus, the Location Prediction Feasibility Module of FIG. 6 might determine that for such an urban topology case as inferred from road network topology and traffic information, it is not feasible to track a UE.

Figure 14:
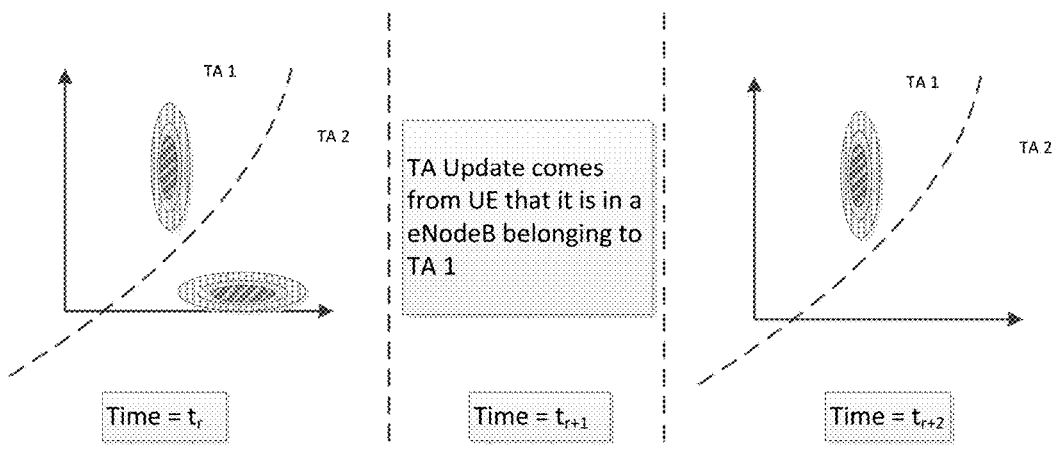
FIG. 14 illustrates an example use of tracking area update information to modify the histogram.

In FIG. 7 and FIG. 8, there is another possibility of updating the histograms for a UE. The possibility occurs when a UE sends a Tracking Area update. When a UE sends a Tracking Area Update, the network knows the TA the UE is in, and thus can use this information to check the validity of the histogram that has been constructed until the time instant of the TA. FIG. 14 illustrates an example use of tracking area update information to modify the histogram. At time '$t_r$,' the network has constructed a histogram as shown in the Figure. This histogram corresponds to the example shown in FIG. 12, where there is one intersection in the road. Since the network is unaware of which direction was taken by the UE, the network assumes equal probabilities for both events and creates the two disjoint elliptical histogram regions. Now at time '$t_r+1$', the UE sends a Tracking Area update with the information that it belongs to a eNodeB that is in TA 1 (the area to the left of the dotted line). The results indicate that the UE is not in the area corresponding to TA 2. Thus in the next time instant, the network modifies the histogram to only the elliptical region inside TA 1.

Figure 15:
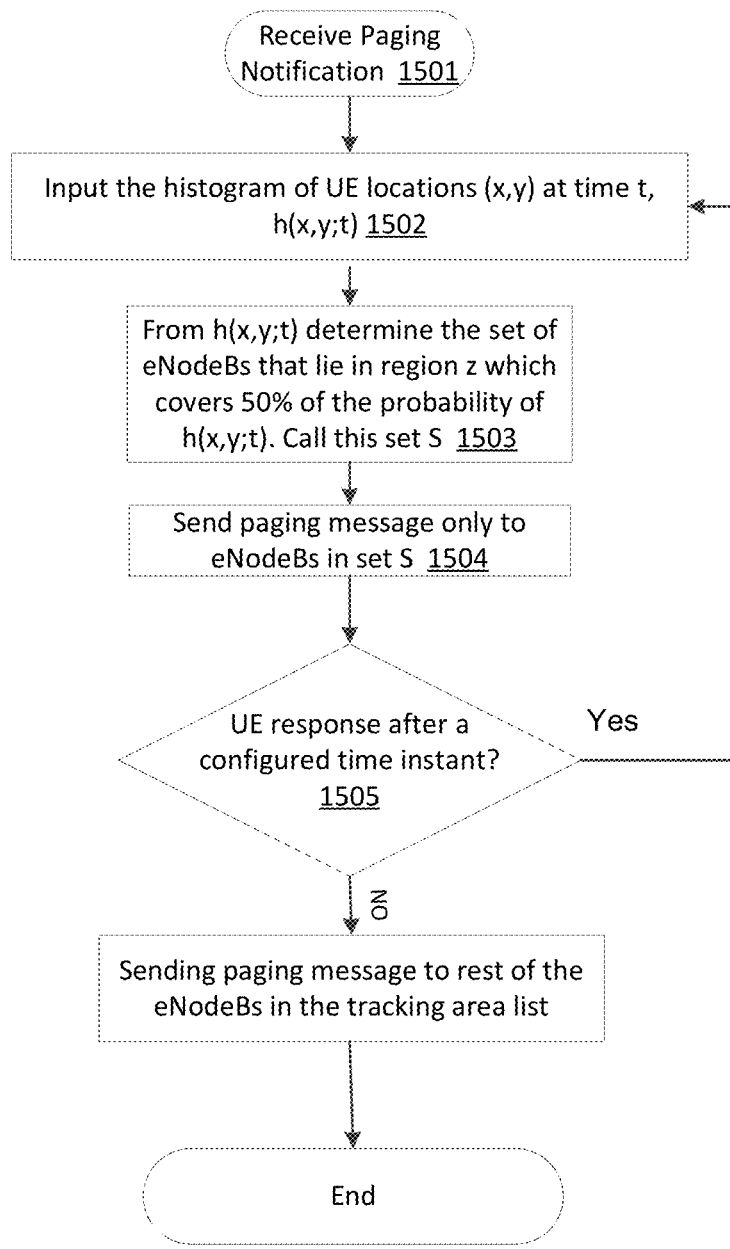
FIG. 15 illustrates an example flow diagram for a paging optimization module, in accordance with an example implementation.

FIG. 15 illustrates an example flow diagram for a paging optimization module, in accordance with an example implementation. The flow begins at 1501 wherein a paging notification is received from a UE. If the paging notification comes for a UE at a given time 't', then the flow inputs the histogram h(x,y;t) at that time t at 1502. At 1503, the flow determines the area in the histogram that covers 50% of the probability, (i.e. the set of base stations such that the probability that the UE is in the combined coverage area of all base stations in that set is 50%) as shown, for example, in FIG. 10. In the example of FIG. 10, the area covering 50% of the probability may be given by the innermost ellipse, region A. Other histogram areas may also be utilized in accordance with the desired implementation, and the present disclosure is not limited to 50% area. At 1504, the flow determines which eNodeBs lie in this area (set S). The paging optimization modules then sends the paging messages of the UE only to the eNodeBs in set S. At 1505, a determination is made as to whether the UE has responded within a configured time instant. If so (yes) then the process ends. Otherwise (No), the flow proceeds to 1506 to send the paging message to all other eNodeBs. In this example implementation, the principle of sequential paging is thereby utilized.

In an example implementation, the implementations may be applied to a connected car. In such an example implementation, the UE mentioned in example implementations can also be a smart vehicle that is enabled with a Long Term Evolution (LTE) chipset. Thus the UE can be a car itself. Example implementations may thereby be advantageously applied to vehicular UEs. For example, in the example implementations of FIG. 4 (Location Tracking Module CONNECTED MODE) there is a check if the UE is moving at vehicular speeds. Such information can be satisfied for vehicular UEs. In the example implementations of FIG. 6, the Location Tracking Feasibility Module is also more likely to feasibly report for vehicular UEs.

Figure 16:
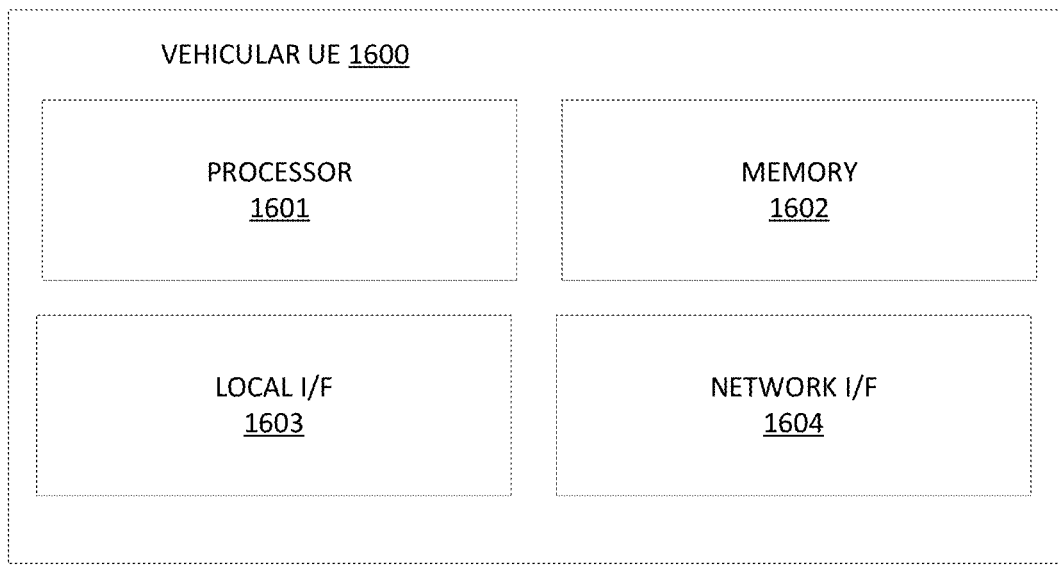
FIG. 16 illustrates an example vehicular UE, in accordance with an example implementation.

FIG. 16 illustrates an example vehicular UE, in accordance with an example implementation. The vehicular UE 1600 includes processor 1601, memory 1602, local interface (I/F) 1603 and network I/F 1604. The example vehicular UE 1600 can be implemented as an LTE chipset that is incorporated into a vehicle (e.g. car, train, etc.), in accordance with the desired implementation. Memory 1602 may store one or more programs that can be executed by processor 1601 for facilitating the flow diagrams of FIGS. 4, 6 and 9. Such implementations can include providing the velocity estimation or the speed of the vehicle to the MME, location information, and so on. Local I/F 1603 is configured to engage with one or more sensors of the vehicle, such as velocity, global positioning satellite (GPS) location information, and so on to facilitate the information needed for the flow diagrams of FIGS. 4, 6 and 9. Network I/F 1604 is configured to communicate with the MME to facilitate information for the execution of the flow diagrams between FIGS. 4 to 9.

Figure 17:
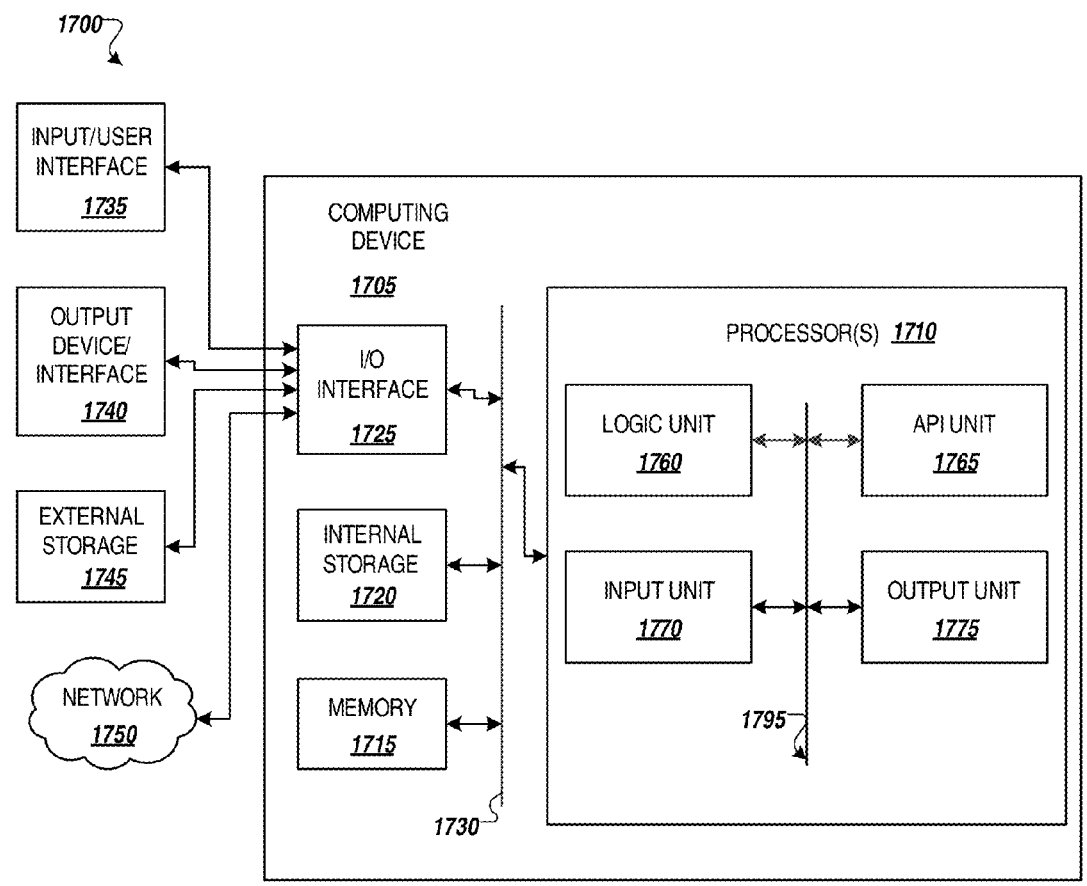
FIG. 17 illustrates an example computing environment with an example computer device suitable for use in some example implementations.

FIG. 17 illustrates an example computing environment with an example computer device suitable for use in some example implementations, such as an MME apparatus. Computer device 1705 in computing environment 1700 can include one or more processing units, cores, or processors 1710, memory 1715 (e.g., RAM, ROM, and/or the like), internal storage 1720 (e.g., magnetic, optical, solid state storage, and/or organic), and/or I/O interface 1725, any of which can be coupled on a communication mechanism or bus 1730 for communicating information or embedded in the computer device 1705.

Computer device 1705 can be communicatively coupled to input/user interface 1735 and output device/interface 1740. Either one or both of input/user interface 1735 and output device/interface 1740 can be a wired or wireless interface and can be detachable. Input/user interface 1735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1740 may include a display, television, monitor, printer, speaker, braille, or the like. In some example implementations, input/user interface 1735 and output device/interface 1740 can be embedded with or physically coupled to the computer device 1705. In other example implementations, other computer devices may function as or provide the functions of input/user interface 1735 and output device/interface 1740 for a computer device 1705.

Examples of computer device 1705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1705 can be communicatively coupled (e.g., via I/O interface 1725) to external storage 1745 and network 1750 for communicating with any number of networked components, devices, and systems, including one or more computer devices of the same or different configuration. Computer device 1705 or any connected computer device can be functioning as, providing services of, or referred to as a server, client, thin server, general machine, special-purpose machine, or another label.

I/O interface 1725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1700. Network 1750 can be any network or combination of networks (e.g., the Internet, local area network, wide area network, a telephonic network, a cellular network, satellite network, and the like).

Computer device 1705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. An apparatus managing a plurality of base stations, comprising:
   a processor, configured to:
   for a determination of a user equipment (UE) in one or more tracking areas managed by the apparatus being in a connected mode:
   obtain a location of the UE from a base station from the plurality of base stations managing the one or more tracking areas of the UE;
   for a determination of a change of the UE from the connected mode to an idle mode, the idle mode suspending one or more activities of the UE upon expiration of a radio resource control (RRC) Inactivity Timer:
   estimate possible locations of the UE based on the obtained location from the connected mode, and road network topology and traffic information;
   for receipt of data directed to the UE while the UE is in the idle mode:
   identify one or more base stations managing a tracking area of at least one of the possible locations; and
   send a paging signal to the identified one or more base stations; and
   a memory configured to store pattern information indicative of a likelihood of the UE being in the idle mode or the connected mode over a period of time;
   wherein the processor is further configured to, for the UE moving at a speed above a first threshold and being at a likelihood of being in the idle mode above a second threshold, obtain the location of the UE from the base station managing the one or more tracking areas of the UE.

2. The apparatus of claim 1, wherein the processor is configured to estimate the possible locations of the UE through a construction of a histogram of possible locations, and wherein the processor is configured to identify the one or more base stations managing the tracking area of the at least one of the possible locations from the histogram.

3. The apparatus of claim 1, further comprising a memory configured to store traffic information indicative of traffic intersections, and wherein the processor is configured to estimate the possible locations based on the obtained location and the traffic information.

4. The apparatus of claim 1, wherein the processor is further configured to update the histogram of the possible locations based on a tracking area update from the UE.

5. The apparatus of claim 1, wherein the processor is configured to construct the histogram through a generation of a time series of histograms from the estimated possible locations, each of the generated time series of histograms indicative of an estimated location at a given time instant.

6. A system, comprising:
a user equipment (UE) configured to communicatively interact with a vehicle, the UE comprising a first processor configured to determine velocity of the UE and location of the UE based on information provided by a vehicle;
an apparatus managing a plurality of base stations and one or more tracking areas of the UE, the apparatus comprising:
a second processor, configured to:
for a determination of the UE being in a connected mode:
obtain the location of the UE from the plurality of base stations managing the one or more tracking areas of the UE;
for a determination of a change of the UE from the connected mode to an idle mode, the idle mode suspending one or more activities of the UE upon expiration of a radio resource control (RRC) Inactivity Timer:
estimate possible locations of the UE based on the obtained location from the connected mode, and road network topology and traffic information;
for receipt of data directed to the UE while the UE is in the idle mode:
identify one or more base stations managing a tracking area of at least one of the possible locations; and
send a paging signal to the identified one or more base stations; and
a memory configured to store pattern information indicative of a likelihood of the UE being in the idle mode or the connected mode over a period of time;
wherein the second processor is further configured to, for the UE moving at a speed above a first threshold and being at a likelihood of being in the idle mode above a second threshold, obtain the location of the UE from the base station managing the one or more tracking areas of the UE.

7. The system of claim 6, wherein the second processor is to estimate the possible locations of the UE through a construction of a histogram of possible locations, and wherein the second processor is configured to identify the one or more base stations managing the tracking area of the at least one of the possible locations from the histogram.

8. The system of claim 7, the apparatus further comprising a memory configured to store traffic information indicative of traffic intersections, and wherein the processor is configured to estimate the possible locations based on the obtained location and the traffic information.

9. The system of claim 7, wherein the second processor is further configured to update the histogram of the possible locations based on a tracking area update from the UE.

10. The system of claim 7, wherein the second processor is configured to construct the histogram through generation of a time series of histograms from the estimated possible locations, each of the generated time series of histograms indicative of an estimated location at a given time instant.

11. A method for an apparatus managing a plurality of base stations and one or more tracking areas, the method comprising:
for a determination of an user equipment (UE) in the one or more tracking areas being in a connected mode:
obtaining a location of the UE from a base station from the plurality of base stations managing the one or more tracking areas of the UE;
for a determination of a change of the UE from the connected mode to an idle mode, the idle mode suspending one or more activities of the UE upon expiration of a radio resource control (RRC) Inactivity Timer:
estimating possible locations of the UE based on the obtained location from the connected mode, and road network topology and traffic information;
for receipt of data directed to the UE while the UE is in the idle mode:
identifying one or more base stations managing a tracking area of at least one of the possible locations; and
sending a paging signal to the identified one or more base stations;
storing pattern information indicative of a likelihood of the UE being in the idle mode or the connected mode over a period of time, and
for the UE moving at a speed above a first threshold and being at a likelihood of being in the idle mode above a second threshold, obtaining the location of the UE from the base station managing the one or more tracking areas of the UE.

12. The method of claim 11, wherein the estimating the possible locations of the UE is through a construction of a histogram of possible locations, and wherein the identifying the one or more base stations managing the tracking area of the at least one of the possible locations from the histogram.

13. The method of claim 11, further comprising managing traffic information indicative of traffic intersections, and estimating the possible locations based on the obtained location and the traffic information.

14. The method of claim 11, further comprising updating the histogram of the estimated possible locations based on a tracking area update from the UE.

15. The method of claim 11, wherein the construction of the histogram is conducted by generating a time series of histograms from the estimated possible locations, each of the generated time series of histograms indicative of an estimated location at a given time instant.

* * * * *